(12) United States Patent
Aiyama (10) Patent No.: US 7,408,666 B2
(45) Date of Patent: Aug. 5, 2008

(54) IMAGE PROCESSING APPARATUS, METHOD, AND CONTROL PROGRAM

(75) Inventor: Kenji Aiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 879 days.

(21) Appl. No.: 10/736,530

(22) Filed: Dec. 17, 2003

(65) Prior Publication Data

US 2004/0125398 A1    Jul. 1, 2004

(30) Foreign Application Priority Data

Dec. 20, 2002  (JP)  ............................. 2002-370428
Dec. 9, 2003   (JP)  ............................. 2003-410560

(51) Int. Cl.
 *G06F 15/00*  (2006.01)
 *G06F 15/16*  (2006.01)
(52) U.S. Cl. ..................................... 358/1.15; 709/229
(58) Field of Classification Search ................ 358/1.15, 358/1.13; 709/229, 223, 225, 217, 227; 400/76; 399/404; 235/380, 382; 714/2, 4
See application file for complete search history.

(56) References Cited

U.S. PATENT DOCUMENTS

| | | | | |
|---|---|---|---|---|
| 5,987,228 A | | 11/1999 | Nishizawa | .................. 395/114 |
| 6,163,383 A | * | 12/2000 | Ota et al. | ..................... 358/1.1 |
| 2002/0145750 A1 | * | 10/2002 | Honda et al. | ............... 358/1.15 |
| 2003/0151762 A1 | * | 8/2003 | Cherry et al. | .............. 358/1.14 |
| 2004/0088378 A1 | * | 5/2004 | Moats | ........................ 709/219 |

FOREIGN PATENT DOCUMENTS

JP  9-258932   10/1997
JP  10-207661  8/1998

OTHER PUBLICATIONS

U.S. Appl. No. 09/203,513, filed Dec. 1, 1998.
U.S. Appl. No. 09/487,720, filed Jan. 19, 2000.
U.S. Appl. No. 10/017,096, filed Dec. 13, 2001.

* cited by examiner

*Primary Examiner*—Saeid Ebrahimi Dehkordy
(74) *Attorney, Agent, or Firm*—Fitzpatrick, Cella, Harper & Scinto (57) ABSTRACT

An image processing method in an image processing apparatus which has storing means for storing group information set every predetermined print service request, receives a print job according to a predetermined print service request from a data processing apparatus, and processes the received print job. This method has: a discriminating step of discriminating whether a print job according to a specific print service request which is received corresponds to the group information stored in the storing means or not; a setting step of, if it is determined by the discriminating step that the print job does not correspond, setting specific group information for enabling the print job to be executed into the non-corresponding print job; and a job control step of controlling permission/inhibition of the execution of the print job according to the predetermined print service request or the specific print service request on the basis of the group information or the specific group information.

11 Claims, 6 Drawing Sheets

| GROUP | PASS CODE | COLOR | MONOCHROMATIC | THE NUMBER OF COLOR PRINT COPIES | THE NUMBER OF MONOCHROMATIC PRINT COPIES | COLOR PRINT LIMITATION | MONOCHROMATIC PRINT LIMITATION |
|---|---|---|---|---|---|---|---|
| SOUMU | 1231 | ○ | ○ | 100 | 311 | 100 | 10000 |
| KEIRI | 9999 | × | ○ | 0 | 401 | 0 | 1000 |
| PORT 9100 | 3210 | × | ○ | 0 | 15 | 0 | 1000 |
| PM | 9871 | ○ | × | 5 | 0 | 100 | 0 |

FIG. 6

STORING MEDIUM SUCH AS FD/CD-ROM, ETC

| DIRECTORY INFORMATION |
|---|
| 1ST DATA PROCESSING PROGRAM<br>PROGRAM CODE GROUP CORRESPONDING TO STEPS OF FLOWCHART SHOWN IN FIG. 3 |
| 2ND DATA PROCESSING PROGRAM<br>PROGRAM CODE GROUP CORRESPONDING TO STEPS OF FLOWCHART SHOWN IN FIG. 5 |
| |

MEMORY MAP IN STORING MEDIUM

IMAGE PROCESSING APPARATUS, METHOD, AND CONTROL PROGRAM

BACKGROUND OF THE INVENTION

1. Field of the Invention

The invention relates to an image processing apparatus for receiving a print job according to a predetermined print service request from a data processing apparatus and processing the received print job.

2. Related Background Art

In recent years, networks have been widespread and it is a general way that image forming apparatuses including a copying apparatus, a printer, a hybrid image processing apparatus in which a scanner and a printer are integrated and image processes are executed, and the like are connected to the network and a plurality of users use them in common.

There is a case where, in enterprises or the like, it is necessary to manage a use situation of the image forming apparatus every division which uses it or permit printing to only the specific user. To cope with such a request, an image forming apparatus having a division managing function has been devised.

For example, according to the proposal shown in JP-A-09-258932, in a network printing apparatus, a managing function such that the user who issued a print job is specified and only the print job issued by the user who has been permitted to print is printed can be provided.

According to the proposal shown in JP-A-10-207661, a means for setting a user name or a group name is provided in a printer driver whose printing is instructed by the user, and therefore a function for permitting/inhibiting the printing and limiting the number of print copies in accordance with the set user name or group name can be provided.

However, there is a problem such that in the case of using the managing function in the conventional image forming apparatus, since the printing can be limited only by the user name or group name, if it is difficult to print by setting the user name or group name, the printing cannot be performed.

SUMMARY OF THE INVENTION

The invention is made to solve the above problem and it is an object of the invention to provide an image processing apparatus which receives a print job according to a predetermined print service request from a data processing apparatus and processes the received print job, wherein when a print job according to a specific print service request which is received does not correspond to group information stored in storing means, specific group information which enables the print job to be executed is set to the non-corresponding print job, and a job process is controlled so as to enable the print job according to the specific print service request to be executed on the basis of the specific group information, so that a print job processing environment having excellent use convenience in which even if a print job whose group information does not correspond is received, the specific group information is allowed to be adapted to the print job according to the specific print service request, the printing process is executed, and a job processing state can be managed can be freely constructed.

To accomplish the above object, according to the invention, there is provided an image processing apparatus which receives a print job according to a predetermined print service request from a data processing apparatus and processes the received print job, comprising: storing means (for example, a RAM 7 shown in FIG. 2) for storing group information set every predetermined print service request; discriminating means (for example, step. (102) which is executed by a CPU 6 shown in FIG. 2) for discriminating whether a print job according to a specific print service request which is received corresponds to the group information stored in the storing means or not; setting means (for example, step (103) which is shown in FIG. 3 and executed by the CPU 6 shown in FIG. 2) for, if it is determined by the discriminating means that the print job does not correspond, setting specific group information for enabling the print job to be executed into the non-corresponding print job; and job control means (for example, step (104) which is shown in FIG. 3 and executed by the CPU 6 shown in FIG. 2) for controlling permission/inhibition of the execution of the print job according to the predetermined print service request or the specific print service request on the basis of the group information or the specific group information.

Other features and advantages of the present invention will be apparent from the following description taken in conjunction with the accompanying drawings, in which like reference characters designate the same or similar parts throughout thereof.

DETAILED DESCRIPTION OF THE PREFERRED EMBODIMENTS

First Embodiment

Figure 1:
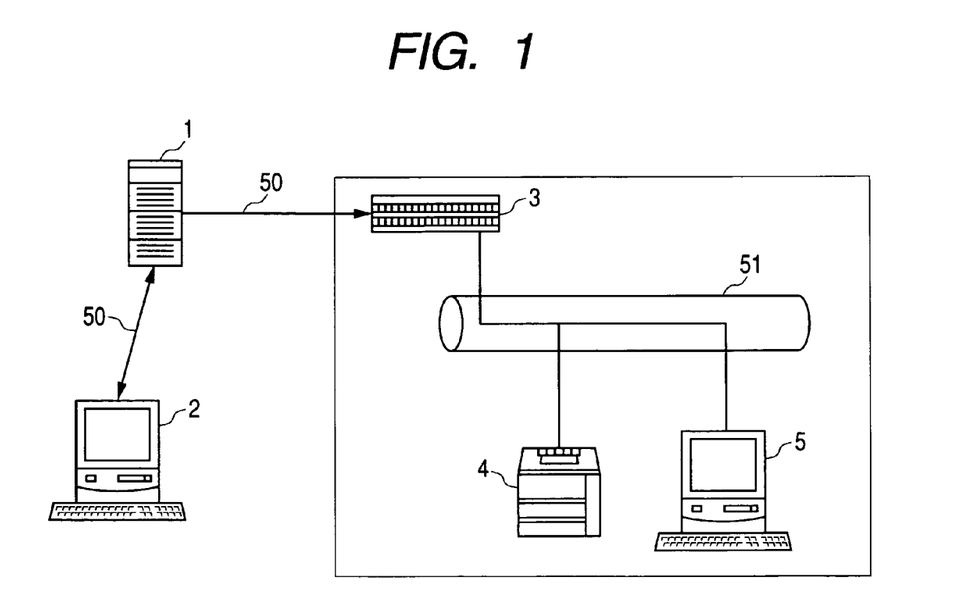
FIG. 1 is a diagram showing an example of a construction of a network print system to which an image forming apparatus according to the invention can be applied.

FIG. 1 is a diagram showing an example of a construction of a network print system to which an image forming apparatus according to the invention can be applied. FIG. 1 shows a print system which can cope with both of a printing function using an Internet print service, which will be explained in detail hereinlater and a printing function using a general print service.

The embodiment will be described on the assumption that the Internet print service is used as a specific print service.

The Internet print service is a print service for transmitting print data to a printer designated from an Internet print client via an Internet print server connected to an Internet and printing.

A unique ID to be specified has been allocated. When the Internet print server receives a print job together with a printer ID number for designating a printer on a print destination side from an Internet print client such as a personal computer (PC)

or the like via the Internet, the Internet print server stores them into storing means in the server.

The printer corresponding to the Internet print service periodically inquires of the Internet print server about the presence or absence of a print job to this printer. When the Internet print server receives the inquiry, if there is a print job to the ID No. of such a printer, the print job is transmitted to the printer.

When the printer receives the print job, a printer locating at a remote position is enabled to print by a system which interprets data of the print job and executes printing.

In FIG. 1, reference numeral 1 denotes an Internet print server. The Internet print server 1 receives the print job together with the ID No. of the printer on the print destination side from an Internet print client 2 via an Internet 50 and stores the received ID No. and print job into a storing device. When the printer of the ID No. issues an inquiry about the presence or absence of the print job to this printer via the Internet 50, the server 1 discriminates whether the print job to the printer of the ID No. exists or not, and if such a print job exists, the server 1 transmits the print job to the printer.

Reference numeral 2 denotes the Internet print client 2 which transmits the print job to the Internet print server 1 via the Internet 50 together with the ID No. of the printer by which the user wants to print. Reference numeral 3 denotes a router for intervening communication between the Internet 50 and a local network 51.

Reference numeral 4 denotes a printer having an ID No. of the Internet printing. The printer 4 inquires of the Internet print server 1 via the local network 51, router 3, and Internet 50 about the presence or absence of the print job to the printer of the ID No. If the print job exists, the print job which is transmitted from the Internet print server is received, data included in the received print job is interpreted, image data to be printed is formed, an image is formed on a sheet, and the print job transferred by lpd print service from another apparatus via the local network 51 is also similarly printed.

Reference numeral 5 denotes a client PC which transmits the print job to the printer 4 via the local network 51 by using the lpd print service. Reference numeral 50 denotes the Internet which logically connects network devices such as Internet print server 1, Internet print client 2, router 3, and the like existing at various locations and becomes a communication path among the network devices. Reference numeral 51 denotes the local network as a communication path among the router 3, printer 4, and client PC 5.

Figure 2:
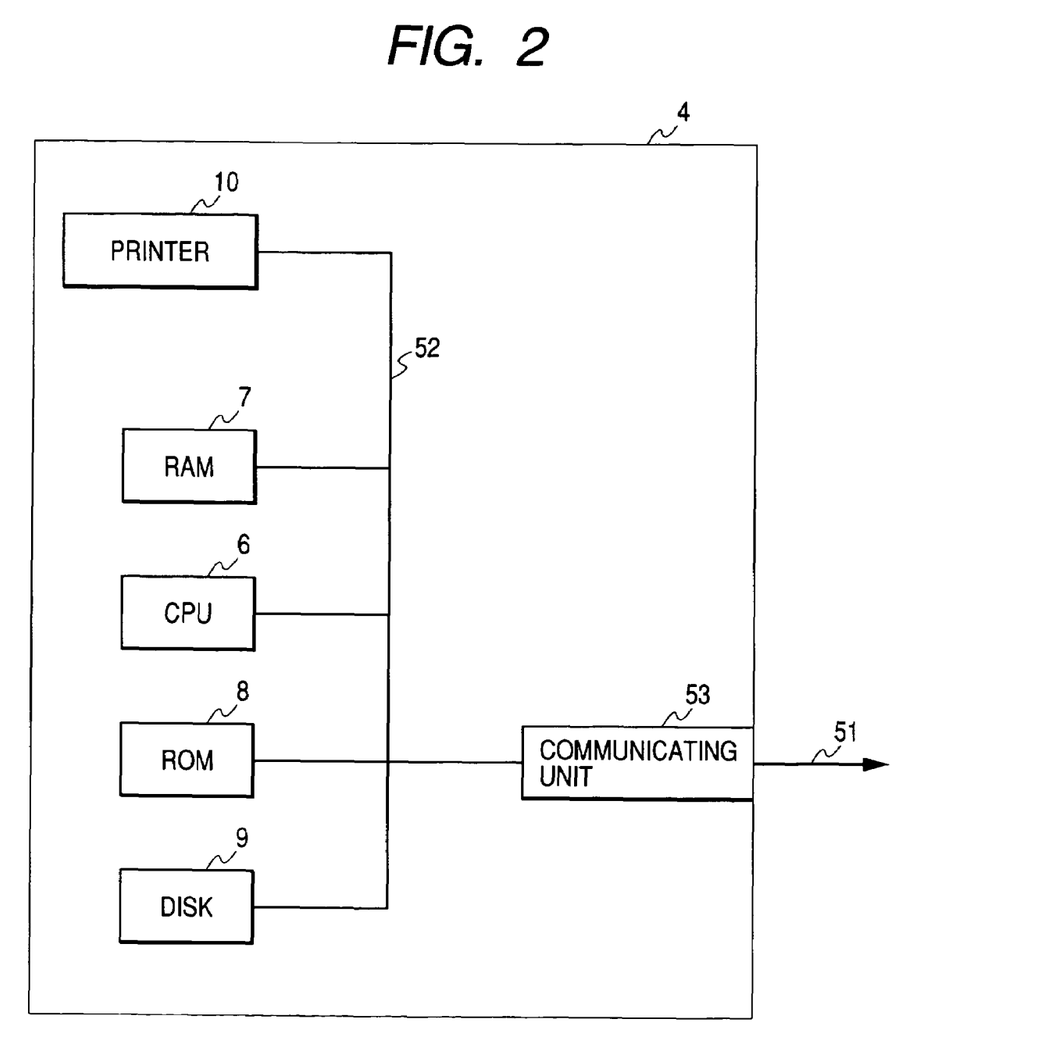
FIG. 2 is a block diagram for explaining a data processing construction of a printer 4 shown in FIG. 1.
Figure 3:
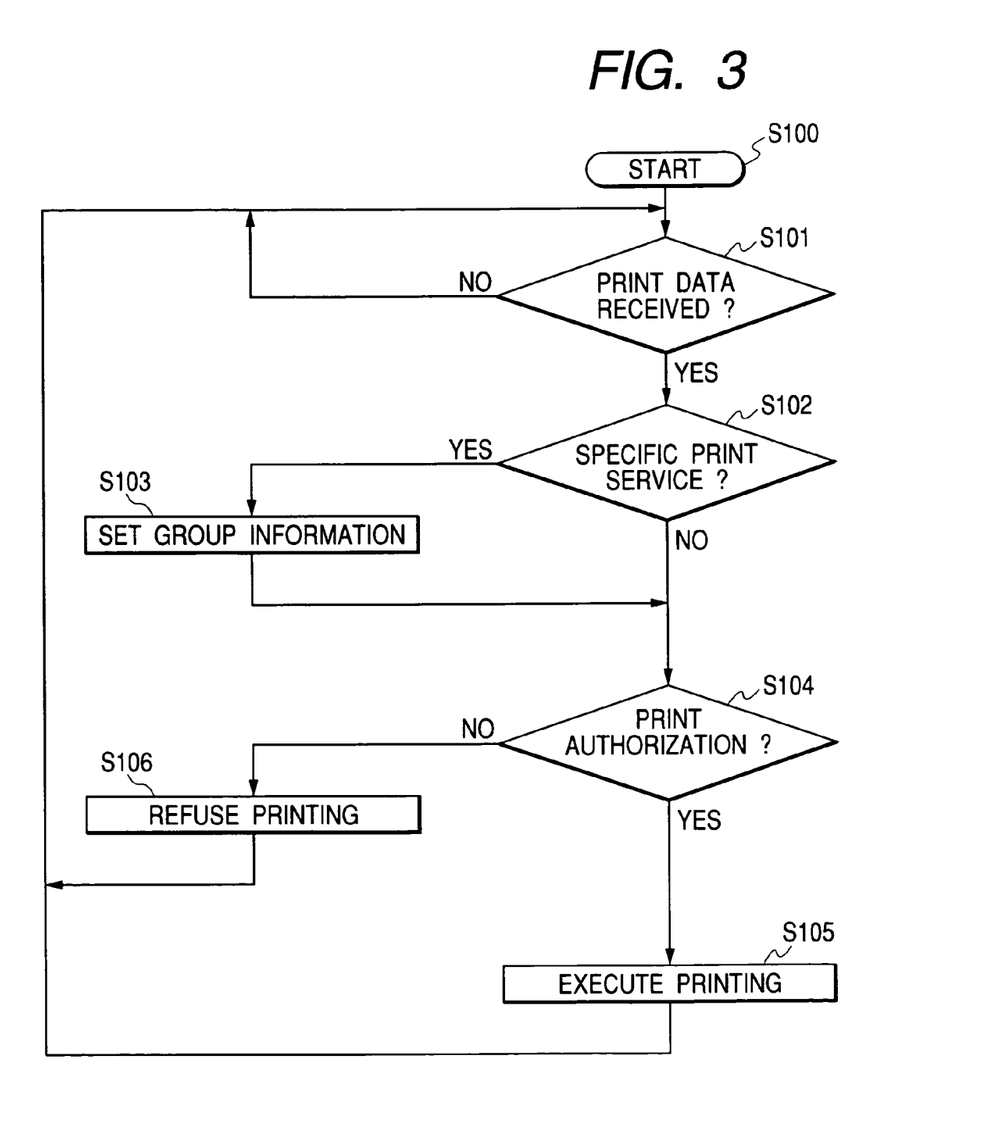
FIG. 3 is a flowchart showing an example of a first data processing procedure in an image output apparatus according to the invention.

FIG. 2 is a block diagram for explaining a data processing construction of the printer 4 shown in FIG. 1 and the same component elements as those in FIG. 1 are designated by the same reference numerals.

In FIG. 2, reference numeral 53 denotes a communicating unit for communicating with an external apparatus via the local network 51. reference numeral 6 denotes a CPU for executing a control program for controlling the whole printer 4.

Reference numeral 7 denotes a RAM whose capacity can be expanded and in which data that is formed upon execution of the program and image data are held; 8 a ROM for holding the control program for processing the print job; and 9 a hard disk for temporarily storing data of the print job.

Reference numeral 10 denotes a printer unit (printer engine) for receiving the image data formed in the RAM 7 via an internal bus 52 and forming an image onto a sheet, and 51 indicates the local network for communicating with the external apparatus.

Reference numeral 52 denotes the communication internal bus which is connected to the printer 4, communicating unit 53, CPU 6, RAM 7, ROM 8, hard disk 9, and printer unit 10 and functions as a communication path among those modules.

In the printer 4 constructed as mentioned above, when a power source is applied and the printer 4 is activated, the control program stored in the ROM 8 is loaded into the RAM 7 and executed. The control program stored in the ROM 8 is interpreted and executed by the CPU 6.

The control program is a program for controlling the whole printer 4. According to this program, the print job received via the communicating unit 53 is transferred to the hard disk 9 via the internal bus 52 and temporarily stored into the hard disk 9. The CPU 6 reads out the data of the print job from the hard disk 9 via the internal bus 52, interprets the data of the print job by the program, and stores the image data into the RAM 7.

After the image data was formed in the RAM 7 as mentioned above, the image data in the RAM 7 is transferred to the printer unit 10 via the internal bus 52 and an image is formed onto the sheet by the printer unit 10.

In the reception of the print job, various print services can be used. For example, the printing can be performed by using the Internet print service besides the print services such as lpd, IPP, Port9100, and the like which are generally used.

Permission/inhibition of the printing of each group-can be set in correspondence to a group name added to the print job. It is assumed here that two groups of "admin" and "pm" are set to the print permission and a group "user" is set to the print inhibition.

The group name which is added to the print job transmitted to the printer 4 can be set into the printer 4 by using the Internet print service. It is assumed here that a group name "pm" has been set.

FIG. 3 is a flowchart showing an example of a first data processing procedure in an image output apparatus according to the invention. FIG. 3 corresponds to the print management control procedure of the printer 4 shown in FIG. 1. Reference numerals (100) to (106) denote processing steps.

First, in step (100), when the printer 4 is activated, the program is started. In step (101), the apparatus waits until the communicating unit 53 receives the print job via the local network 51. When the print job is received in step (101), the print job is stored into the hard disk 9 via the internal bus 52.

At this time, print service information showing which print service has been used to transfer the print job and, if information of the group name is included in the print job, the information of the group name is also stored together with the print job. A method of discriminating which print service has been used to transfer the print job will be explained.

Generally, it is necessary for the printer to correspond to various print protocols in order to receive the print data from various client computers.

For this purpose, programs or software modules which are different every print protocol are prepared, by which protocol a connecting request from the client computer has been made via the network is discriminated, the connecting request is processed by using the program or software module corresponding to such a protocol.

In the discrimination about the connecting protocol, for example, in the case of the print service on a TCP/IP protocol, a print protocol has been specified in correspondence to a port number of TCP/IP. When the connecting request to a specific port No. is issued, the program or software module corresponding to such a port No. is used.

For example, if the connecting request is issued to the port No. 631 of the TCP/IP protocol, it is determined that it is a request for transfer of the print data in the Internet printing protocol. If the connecting request is issued to the port No. 9100, it is determined that it is a request for transfer of the print data in the PORT9100 protocol. The connecting request is processed by the program or software module corresponding to such a port No. and the print data is received.

At a point of time when the connection is established as mentioned above, the printer can discriminate by which print protocol the communication is made.

In the embodiment, it is assumed that the print service is either lpd or the Internet printing.

In step (102), the print service information stored in the hard disk 9 is read out from the hard disk 9 and whether the print service information is the Internet print service (specific print service) or not is discriminated. If it is determined that it is the specific print service, for example, if the print service information is the Internet print service, "pm" as a preset group name for the Internet print service is set as a group name in step (103). Step (104) follows.

As mentioned above, the discrimination about whether the request connected from the outside via the network is the Internet printing or the print service of lpd can be made by a method whereby the print service recognizes the name of the connected port and makes such a discrimination in step (102) of the print control procedure, and the subsequent processes can be executed in accordance with a result of the discrimination.

If it is determined in step (102) that the print service information is not the specific print service, whether the group name set in the print job on the basis of the setting of preset print authorization is the name of the group whose printing has been permitted or not is discriminated in step (104). If it is determined that the group name is the permitted group name, in step (105), the printing is executed. Specifically speaking, the data of the print job stored in the hard disk 9 is read out via the internal bus 52 and interpreted by the program which is executed by the CPU 6 and the image data is formed and stored into the RAM 7. The stored image data is transferred to the printer unit 10 via the internal bus 52 and an image is formed onto the sheet. The processing routine is returned to step (101).

If it is determined in step (104) that the group name is not the permitted group name, the printing is refused in step (106) and the print job stored in the hard disk 9 is deleted. After that, the processing routine is returned to step (101).

Thus, in the embodiment, if the group name is the two group names "admin" and "pm" in step (104), the printing is permitted in step (105). If the group name is the group name "user", the printing is refused in step (106). The flow of the print management control procedure has been described above.

Explanation will be made hereinbelow along the flow of the above processes with respect to the case of printing on the basis of the group name "admin" by using lpd from the client PC 5 in the network print system shown in FIG. 1 and the case of printing on the basis of the group name "user".

In both cases, in step (101) shown in FIG. 3, the print job and the group name information included in the print job are stored into the hard disk 9. In step (102), those information is read out from the hard disk 9 and since the print service is lpd, step (104) is executed.

In step (104), if the group name is "admin", it is determined that the printing is permitted. The printing is executed in step (105).

If the group name is "user", it is determined that the printing is not permitted. Therefore, the printing is not executed in step (106) and the print job stored in the hard disk 9 is erased.

A flow in the case of printing by using the Internet print service will now be described.

When the user of the Internet print service transmits from the Internet print client 2 the print job to the Internet print server 1, designating the ID No. allocated to the printer 4, the transmitted print job is transferred to the Internet print server 1 via the Internet 50.

The Internet print server 1 stores the print job transmitted from the Internet print client 2 and waits for the inquiry from the printer of the relevant ID number.

The printer 4 periodically inquires of the Internet print server 1 about the presence or absence of the print job to the printer 4 via the local network 51, router 3, and Internet 50.

If the print job to the ID No. allocated to the printer 4 has been transferred to the Internet print server 1, the print job is transmitted from the Internet print server 1 to the printer 4 via the Internet 50, router 3, and local network 51.

The transmitted print job is received by the printer 4 via the communicating unit 53. In step (101), the print job is stored into the hard disk 9. The print job is read out from the hard disk 9 in step (102). Since the print service is the Internet print service, step (103) is executed.

Specifically speaking, "pm" as a group name for the Internet print service is set as a group name in step (103) and step (104) is executed.

In step (104), it is determined that the printing of the print job of the group name "pm" has been permitted. Step (105) is executed and the printing is executed.

If the printing of the group name "pm" is not permitted, it is determined in step (104) that the printing is not permitted. In step (106), the printing is not executed and the print job stored in the hard disk 9 is erased.

As described above, according to the embodiment, in addition to that the print job which is printed by using the general print service such as lpd or the like can designate permission/inhibition of the printing in accordance with the group name which is added to the print job, even in the case of a print job which is printed by using a print service which cannot add a group name such as Internet printing or the like, the group name corresponding to such a print service can be set. A print processing environment in which print management so as to limit the printing using such a print service in accordance with the setting of permission/inhibition of the printing in such a group name can be made can be freely constructed.

Second Embodiment

In the first embodiment, the case where the group information is set in step (103) shown in FIG. 3 and if the set group information has the print authorization, all of the printing functions of the printer 4 can be executed has been described. However, it is possible to make control so as to individually limit the printing functions of the printer 4 with reference to a print management control table set into the group. Such an embodiment will be described hereinbelow.

It is assumed that an image processing apparatus in the second embodiment has a construction similar to that shown in the first embodiment.

Figure 4:
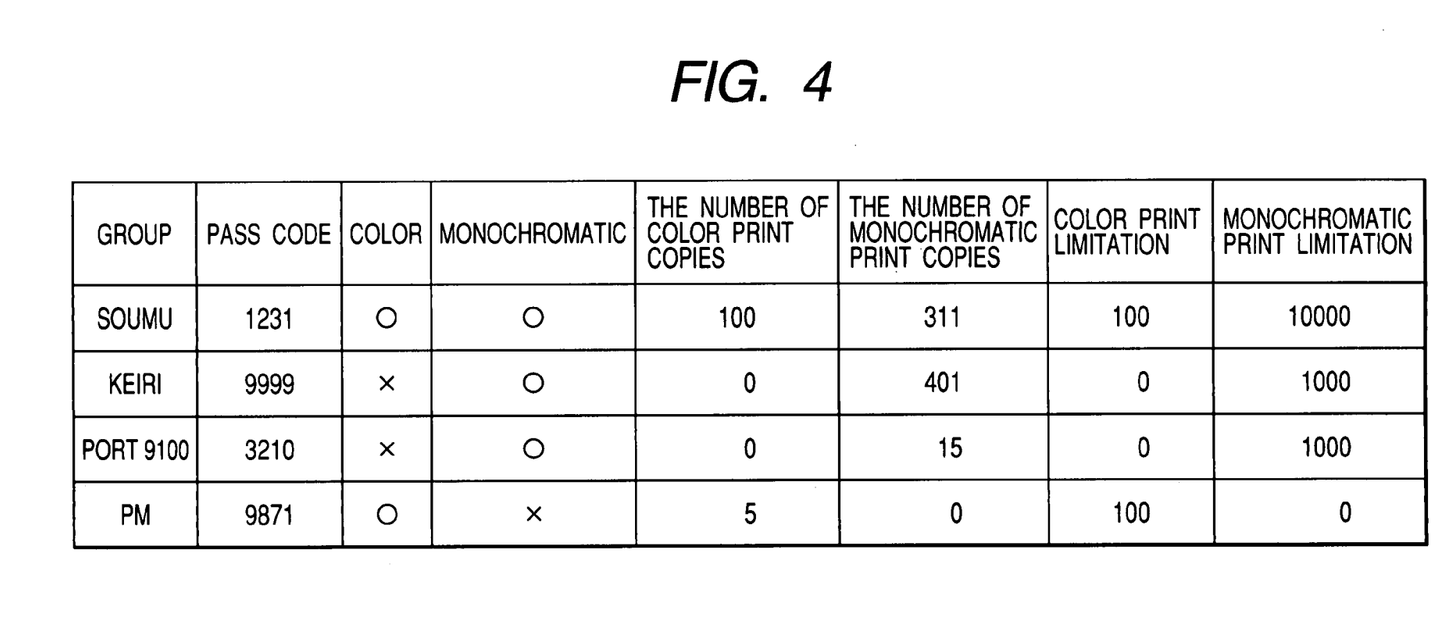
FIG. 4 is a diagram showing an example of a print management control table which is managed on a RAM shown in FIG. 2.

FIG. 4 is a diagram showing an example of the print management control table which is managed on the RAM 7 shown in FIG. 2.

As shown in FIG. 4, in the second embodiment, it is assumed that in the print management control table, "port9100" is set as a group name for the PORT9100 print service, "3210" is set as a passcode, "pm" is set as a group name for the Internet print service, and "9871" is set as a passcode, respectively.

In the embodiment, it is assumed that the printer 4 is a printer corresponding to three print services of lpd, PORT9100, and Internet printing and the client PC 5 can transmit the print job to the printer 4 by using the print services of lpd and PORT9100.

Further, it is assumed that in the printer 4, the print management control table shown in FIG. 4 is held in, for example, the RAM 7. In accordance with a print management control program (according to a control procedure shown in FIG. 5, which will be explained hereinlater) which operates in the printer 4, a plurality of groups names, passcodes corresponding thereto, whether the color printing and/or the monochromatic printing can be performed by the group name or not, the number of color print copies, the number of monochromatic print copies, limitation of the number of color print copies, and limitation of the number of monochromatic print copies are controlled on the basis of the settings on the print management control table shown in FIG. 4.

In FIG. 4, for example, when the item of "color" is "o", the color printing in this group name is permitted. When the item of "color" is "x", the color printing is not permitted.

Similarly, when the item of "monochromatic" is "o", the monochromatic printing is permitted. When the item of "monochromatic" is "x", the monochromatic printing is not permitted.

The item of "color print limitation" shows the limitation of the number of print copies which can be printed in color in the relevant group name. The item of "monochromatic print limitation" shows the limitation of the number of print copies which can be printed in monochromatic color in the relevant group name.

The item of "the number of color print copies" indicates the total number of color print copies printed in the relevant group name. The item of "the number of monochromatic print copies" indicates the total number of monochromatic print copies printed in the relevant group name.

A construction of the client PC 5 in the embodiment will now be described.

It is assumed that in the client PC 5 shown in FIG. 1, the print job can be transmitted to the printer 4 by using lpd and PORT9100, in the case of transmitting by lpd, the group name and the passcode are added to the print job by the setting in the printer driver, the resultant print job is transmitted, and in the case of transmitting by PORT9100, the group name and the passcode are not added.

Figure 5:
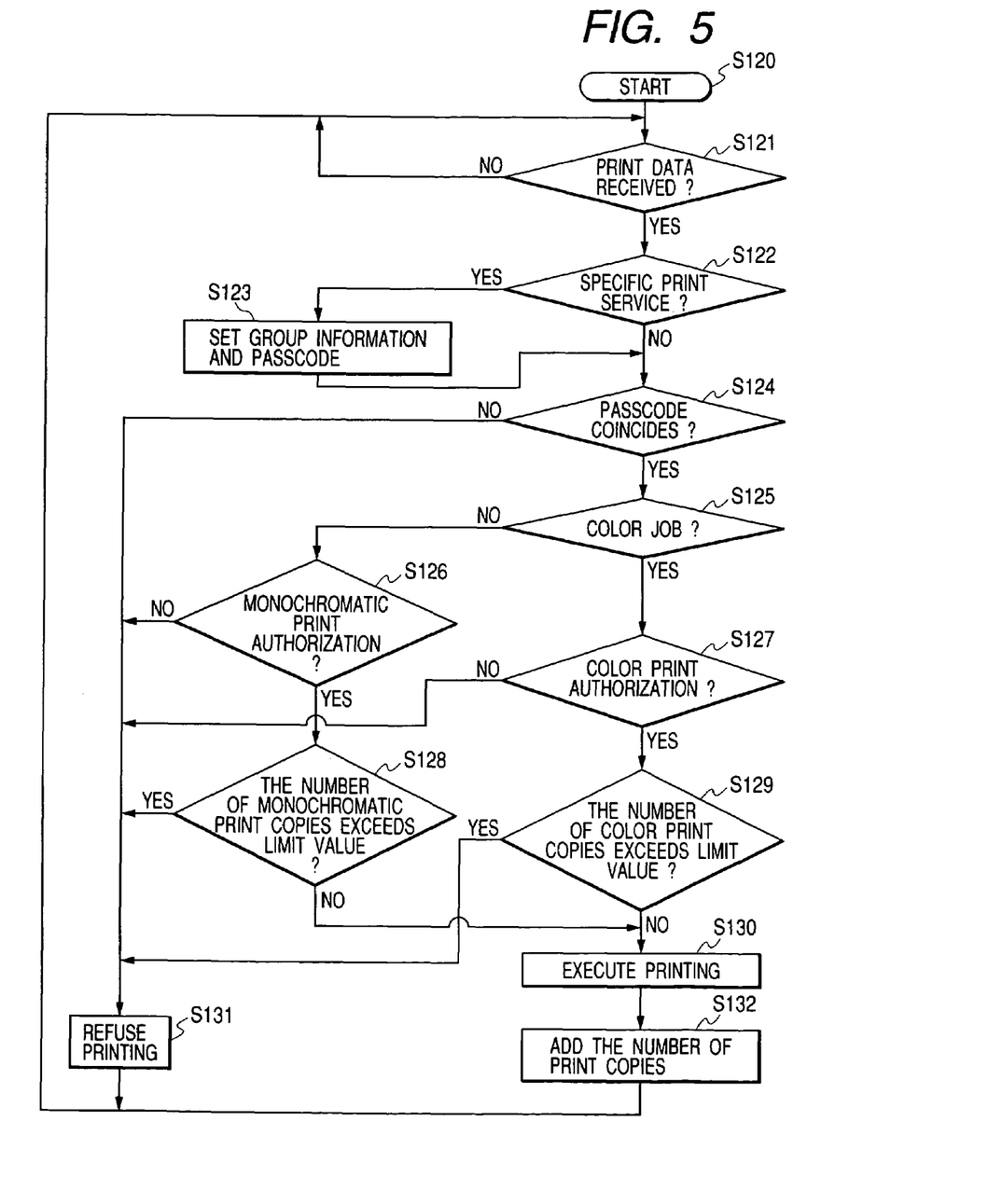
FIG. 5 is a flowchart showing an example of a second data processing procedure in an image output apparatus according to the invention.

FIG. 5 is a flowchart showing an example of a second data processing procedure in the image output apparatus according to the invention and corresponds to, for example, the print management control procedure of the printer 4 shown in FIG. 1. Reference numerals (120) to (132) denote processing steps.

First, when the program to activate the printer 4 is started in step (120), the apparatus waits until the communicating unit 53 receives the print job via the local network 51 in step (121). When the print job is received, the print job is stored into the hard disk 9 via the internal bus 52.

At this time, print service information showing which print service has been used to transfer the print job and, if information of the group name and the passcode is included in the print job, the information of the group name and the passcode is also stored together with the print job. The print service is one of lpd, PORT9100, and Internet printing.

In next step (122), the print service information stored in the hard disk 9 is read out from the hard disk 9 and whether the print service information indicates the specific print service such as PORT9100 print service, Internet print service, or the like or not is discriminated. If it is determined that the print service information indicates the specific print service, step (123) follows. When the print service information indicates the Internet print service, "pm" is set as a group name and "9871" is set as a passcode, and when the print service information indicates the PORT9100 print service, "port9100" is set as a group name and "3210" is set as a passcode. The processing routine advances to step (124).

If it is determined in step (122) that the print service information does not indicate the specific print service, the CPU 6 discriminates whether a combination of the set group name and passcode coincides with one of the combinations of the group names and the passcodes in the table shown in FIG. 4 or not. If it is determined that the combination coincides, step (125) follows.

In step (125), the print job stored in the hard disk 9 is read out and whether the print job should be printed in color or monochromatic color is discriminated. Such a discrimination is realized by, for example, a method whereby the CPU 6 interprets the data of the print job and discriminates whether an image can be formed only by black toner or not.

If it is decided in step (125) that the print job is not a job which should be printed in color, step (126) follows. The CPU 6 discriminates whether the monochromatic printing is permitted to the group of the group name set in such a print job or not by using the print management control table shown in FIG. 4. If it is determined that the monochromatic printing is permitted, step (128) follows. If it is determined that the monochromatic printing is not permitted, step (131) follows.

If it is determined in step (125) that the print job is the job which should be printed in color, step (127) follows. The CPU 6 discriminates whether the color printing is permitted to the group of the group name set in such a print job or not by using the print management control table shown in FIG. 4. If it is determined that the color printing is permitted, step (129) follows. If it is determined that the color printing is not permitted, step (131) follows.

In step (128), the CPU 6 discriminates whether the number of print copies exceeds the limit value of the number of monochromatic print copies set in the group of the group name set in the print job or not by using the print management control table shown in FIG. 4. If it is determined that the number exceeds, step (131) follows. If it is determined that the number does not exceed, step (130) follows.

In step (129), the CPU 6 discriminates whether the number of print copies exceeds the limit value of the number of color print copies set in the group of the group name set in the print job or not by using the print management control table shown in FIG. 4. If it is determined that the number exceeds, step (131) follows. If it is determined that the number does not exceed, step (130) follows.

In step (130), the print job is read out from the hard disk 9, the print data is interpreted, and image data is formed in the RAM 7. The formed image data is transferred to the printer unit 10 via the internal bus 52 and an image is formed onto the sheet.

After completion of the printing, in step (132), the number of print copies of the group corresponding to the print management control table shown in FIG. 4 is updated. Specifically speaking, in the case of printing in color, the number of print copies of the print job is added to the number of color print copies of the group of the group name set in this job. In the case of printing in monochromatic color, the number of print copies of the print job is added to the number of monochromatic print copies. After that, the processing routine is returned to step (121).

If it is determined in step (124) that the passcode does not coincide, if it is determined in step (126) that there is no monochromatic print authorization, if it is determined in step (127) that there is no color print authorization, or further, if it is determined in step (129) that the number of print copies exceeds the limit value of the number of color print copies, in step (131), the process of the print job is refused, the printing is not executed, and the print job stored in the hard disk 9 is erased. After that, the processing routine is returned to step (121). The flow of the second print management control procedure has been described above.

Explanation will be made hereinbelow along the flow of the above second print management control procedure with respect to an example of the actual print job processing states in several conditions (based on the contents registered in the print management control table shown in FIG. 4).

First, when the client PC 5 prints by using lpd, if the group name is "guest" and the passcode is "1111", since the group name does not coincide with all of the group names held in the print management control table shown in FIG. 4 in step (124), the printing is not executed.

Similarly, if the group name is "soumu" and the passcode is "1111", although the group name coincides with the group name held in the print management control table shown in FIG. 4 in step (124), since the passcode does not coincide, the printing is not executed.

Further, if the group name is "soumu", the passcode is, for example, "1231", and the print job indicates the monochromatic printing, they coincide with a combination of the group name and the passcode held in the print management control table shown in FIG. 4 in step (124). It is determined in step (125) that the print job is the monochromatic job. It is determined in step (126) that the monochromatic print authorization has been given in the case of the group name "soumu". In this example, since the number of monochromatic print copies of the group name "soumu" is equal to 311 and does not reach the upper limit of the limitation of the number of monochromatic print copies, for example, 10000, it is determined in step (128) that the number of print copies does not exceed the limit value. Thus, the relevant print job is printed in step (130).

If the group name is "soumu", the passcode is "1231", and the print job indicates the color printing, they coincide with a combination of the group name and the passcode held in the print management control table shown in FIG. 4 in step (124). It is determined in step (125) that the print job is the color job. It is determined in step (126) that the color print authorization has been given in the case of the group name "soumu". In this example, since the number of color print copies of the group name "soumu" is equal to 100 and reaches the value "100" which has been set as a limit value of the number of color print copies, the CPU 6 determines in step (129) that the number of print copies exceeds the limit value. The print job which requests the color printing is refused in step (131).

If the group name is "keiri", the passcode is "9999", and the print job indicates the color printing, they coincide with a combination of the group name and the passcode held in the print management control table shown in FIG. 4 in step (124). It is determined in step (125) that the print job is the color job. It is determined in step (126) that the color print authorization is not given in the case of the group name "keiri". The printing of this print job is refused.

The case where the client PC 5 executes the printing of the color job by using PORT9100 will now be described.

The print job transmitted from the client PC 5 is received via the communicating unit 53. In step (121), the print job is stored into the hard disk 9. In step (122), the print job is read out from the hard disk 9. Since the print service is the PORT9100 print service, step (123) is executed.

In step (123), "port9100" as a group name for the PORT9100 print service is set as a group name and "3210" is set as a passcode corresponding to the group name.

In step (124), the CPU 6 determines that a combination of the group name and passcode which have been set in step (123) coincides with that held in the print management control table shown in FIG. 4. In step (125), it is decided that the print job is the color job. It is determined in step (127) that the color print authorization is not given. The printing of the print job to "port9100" as a group name is not executed.

If the print job to "port9100" as a group name is the monochromatic job, it is determined in step (125) that the print job is the monochromatic job. It is determined in step (126) that the monochromatic print authorization has been given. It is determined in step (128) that the number of monochromatic print copies in the group "port9100" in the print management control table does not exceed the limit value of the number of monochromatic print copies ("1000"). The printing is executed.

The case where the print job has been transmitted by using the Internet print service will now be described. It is assumed here that the print job is a print job which should be printed in color.

When the user of the Internet print service designates the ID No. allocated from the Internet print client 2 to the printer 4 and transmits the print job to the Internet print server 1, designating the ID No. allocated to the printer 4, the transmitted print job is transferred to the Internet print server 1 via the Internet 50.

The Internet print server 1 stores the print job transmitted from the Internet print client 2 and waits for an inquiry from the printer of the designated ID number.

The printer 4 periodically inquires of the Internet print server 1 via the local network 51, router 3, and Internet 50 about the presence or absence of the print job to the printer 4.

If it is determined that the print job to the ID No. allocated to the printer 4 exists in the Internet print server 1, this print job is transmitted to the printer 4 from the Internet print server 1 via the Internet 50, router 3, and local network 51.

The print job is received via the communicating unit 53. In step (121), the print job and print service information showing that the print data has been received by the Internet printing are stored into the hard disk 9. In step (122), they are read out from the hard disk 9. Since the print service is the Internet print service, step (123) is executed.

In step (123), "pm" as a group name for the Internet print service is set as a group name and, for example, "9871" is set as a passcode corresponding to it.

Subsequently, the CPU 6 determines in step (124) that the combination of the group name and the passcode which have been set in step (123) coincides with that held in the print management control table shown in FIG. 4. It is determined in step (125) that the print job is the color job. It is determined in step (127) that the color print authorization has been given. It is determined in step (129) that the number of color print copies in the group "pm" in the print management control table shown in FIG. 4 does not exceed the limit value of the number of color print copies ("100"). The printing is executed.

When the print job indicates the monochromatic printing, it is determined in step (125) that the print job is the monochromatic job and it is determined in step (126) that there is no monochromatic print authorization. Thus, the printing is not executed.

As described above, according to the embodiment, the combinations of a plurality of group names and the passcodes are held, the permission of the color printing in each group name, the permission of the monochromatic printing, the limitation of the number of color print copies, and the limitation of the number of monochromatic print copies can be performed. By setting the preset group name and passcode into the print job received via the specific print service, the print limitation such as permission of the color printing, permission of the monochromatic printing, limitation of the number of color print copies, limitation of the number of monochromatic print copies, and the like can be also performed to the print job received via the specific print service by using the existing print management control mechanism.

Figure 6:
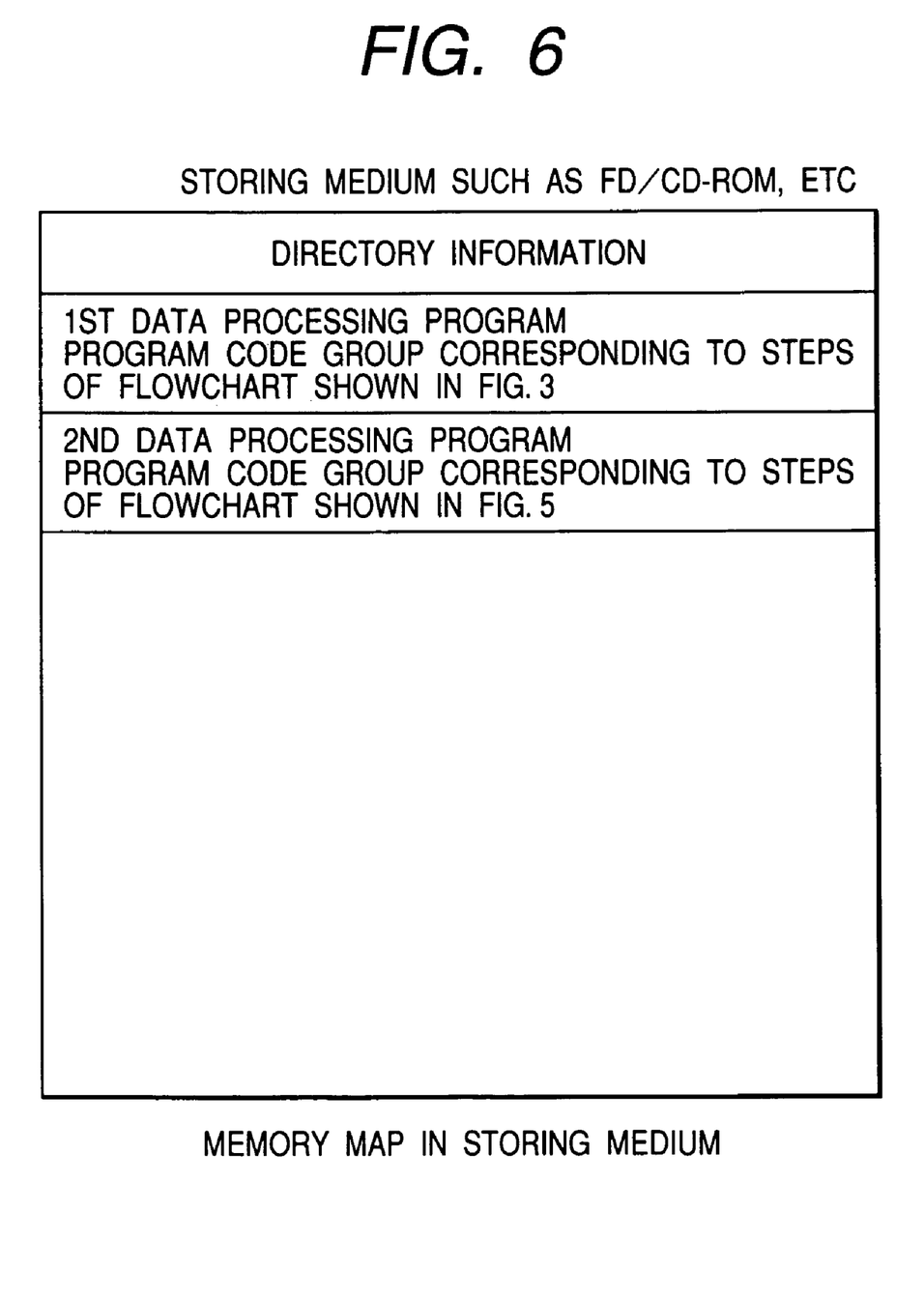
FIG. 6 is a diagram for explaining a memory map on a storing medium for storing various data processing programs which can be read out by an image processing apparatus according to the invention.

FIG. 6 is a diagram for explaining a memory map on a storing medium for storing various data processing programs which can be read out by the image processing apparatus according to the invention.

Although not shown, information for managing program groups which are stored into the storing medium, for example, version information, implementors, and the like are also stored and there is also a case where information depending on the OS or the like on the program reading side, for example, icons and the like for identifying and displaying the programs are also stored.

Further, data depending on the various programs is also managed in the directory. There is also a case where a program for installing the various programs into a computer and, if the installing program has been compressed, a program for decompressing it, and the like are also stored.

The functions shown in FIGS. 2 and 3 in the embodiments can be executed by a host computer in accordance with a program which is installed from the outside. In such a case, the invention is also applied to the case where an information group including the programs is supplied to the output apparatus by a storing medium such as CD-ROM, flash memory, FD, or the like or from an external storing medium via a network.

Naturally, the objects of the invention are accomplished by a method whereby the storing medium in which program codes of software for realizing the functions of the embodiments mentioned above have been recorded as mentioned above is supplied to a system or an apparatus and a computer (or a CPU or an MPU) of the system or the apparatus reads out and executes the program codes stored in the storing medium.

In such a case, the program codes themselves read out from the storing medium realize the novel functions of the invention and the storing medium in which the program codes have been stored constructs the invention.

As a storing medium for supplying the program codes, for example, a flexible disk, a hard disk, an optical disk, a magnetooptic disk, a CD-ROM, a CD-R, a magnetic tape, a nonvolatile memory card, a ROM, an EEPROM, or the like can be used.

Naturally, the invention incorporates not only the case where a computer executes the read-out program codes, so that the functions of the embodiments mentioned above are realized but also the case where an OS (Operating System) or the like which is operating on the computer executes a part or all of actual processes on the basis of instructions of the program codes and the functions of the embodiments mentioned above are realized by those processes.

Further, naturally, the invention incorporates the case where the program codes read out from the storing medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes, and the functions of the embodiments mentioned above are realized by those processes.

The invention is not limited to the foregoing embodiments but various modifications (including an organic combination of the embodiments) are possible on the basis of the spirit of the invention and they are not excluded from the scope of the invention. For example, the following examples are considered.

If the service such as Internet printing is used, an unspecified number of users can print by the printers via the Internet. However, if the printing is limited by the user name or the group name, since there is no means for setting the user name or the group name, the printing cannot be executed. However, according to the invention, when the print job is sent via the Internet printing, even if the user name or the group name is not set, the printing can be executed by the preset user name or group name.

Further, in the color printer, when the print jobs can be received via two different print services, the color printing and the monochromatic printing are permitted to the print job received via the first print service, only the monochromatic printing is permitted to the print job received via the second print service, or the like. In this manner, the use limitation of the image processing apparatus according to the combination of various print data conditions and print services can be set.

Moreover, since the image processing apparatus can manage the number of print copies on a user or group unit basis, the number of printable sheets can be limited every user or every group and the unnecessary printing can be suppressed.

Further, since the image processing apparatus can manage the number of print copies on a user or group unit basis in accordance with conditions of the print data, for example, the number of color print copies can be limited every user or every group and the number of color print copies of high costs can be suppressed. The number of print jobs received via the specific print services can be limited.

In addition, unless the user knows both of the group ID information of the group which can be used by himself and the passcode information of this group, the printing in this group cannot be performed. A situation such that the printing is executed by illegally using the group which cannot be used by the ordinary printing method can be prevented. Even in the case of using a print service in which it is difficult that the group ID information and the passcode information are included in the print data, by setting the preset group ID information and passcode information of each print service, the printing can be executed.

Moreover, since standard values of the group ID information and the passcode information of each print service can be changed, even in the case where a necessity to change the group ID information or the passcode information for each print service is caused for convenience of management, it is possible to cope with such a case by changing the settings.

What is claimed is:

1. An image processing apparatus which receives a print job according to a predetermined print service request from a data processing apparatus and processes the received print job, comprising:

storing means for storing a plurality of pieces of group information in correspondence to job issuers;

setting means for setting specific group information to a print job received according to a specific print protocol and having no identification showing a job issuer thereof so as to enable execution of the print job, the specific group information corresponding to the specific print protocol; and job control means for controlling permission/inhibition of the execution of each received print job on the basis of the plurality of pieces of group information stored by said storing means or the specific group information set by said setting means, if authentication for the stored group information is successful.

2. An apparatus according to claim 1, wherein the specific print service request is an Internet print service.

3. An apparatus according to claim 1, wherein said setting means sets the specific group information and a passcode so as to enable execution of the print job.

4. An apparatus according to claim 1, wherein said job control means controls the permission/inhibition of the execution of the print job on the basis of a job management table.

5. An apparatus according to claim 1, further comprising discriminating means for discriminating whether or not a print job is received according to the specific print protocol in accordance with a port connected by said print service.

6. An image processing method in an image processing apparatus which has storing means for storing group information set every predetermined print service request, receives a print job according to said predetermined print service request from a data processing apparatus, and processes the received print job, comprising:

a setting step of setting specific group information to a print job received according to a specific print protocol and having no identification showing a job issuer thereof so as to enable execution of the print job, the specific group information corresponding to the specific print protocol; and a job control step of controlling permission/inhibition of the execution of each received print job on the basis of the plurality of pieces of group information stored in said storing step or the specific group information set in said setting step, if authentication for the stored group information is successful.

7. A method according to claim 6, wherein the specific print service request is an Internet print service.

8. A method according to claim 6, wherein in said setting step, the specific group information and a passcode so as to enable execution of the print job.

9. A method according to claim 6, wherein in said job control step, the permission/inhibition of the execution of the print job is controlled on the basis of a job management table.

10. A method according to claim 6, further comprising a discriminating step of discriminating whether or not a print job is received according to the specific print protocol in accordance with a port connected by said print service.

11. A computer-readable storage medium storing a computer-executable control program for an image processing method in an image processing apparatus which has storing means for storing group information set every predetermined print service request, receives a print job according to said predetermined print service request from a data processing apparatus, and processes the received print job, wherein said control program allows a CPU to execute:

a setting step of setting specific group information tot a print job received according to a specific print protocol and having no identification showing a job issuer thereof so as to enable execution of the print job, the specific group information corresponding to the specific print protocol; and a job control step of controlling permission/inhibition of the execution of each received print job on the basis of the plurality of pieces of group information stored in said storing step or the specific group information set in said setting step, if authentication for the stored group information is successful.

* * * * *

UNITED STATES PATENT AND TRADEMARK OFFICE
CERTIFICATE OF CORRECTION

PATENT NO. : 7,408,666 B2
APPLICATION NO. : 10/736530
DATED : August 5, 2008
INVENTOR(S) : Kenji Aiyama It is certified that error appears in the above-identified patent and that said Letters Patent is hereby corrected as shown below:

COLUMN 2:
    Line 2, "step. (102)" should read -- step (102) --; and
    Line 53, "of" should be deleted.

COLUMN 3:
    Line 52, "reference" should read -- Reference --.

COLUMN 4:
    Line 25, "group-can" should read -- group can --.

COLUMN 5:
    Line 58, "those" should read -- that --.

COLUMN 8:
    Line 47, "exceeds," should read -- exceeds the limit value, --; and
    Line 49, "exceeds," should read -- exceeds the limit value, --.

COLUMN 12:
    Line 29, "limited" should read -- limited with --;
    Line 34, "limited" should read -- limited with --;
    Line 38, "of" should be deleted;
    Line 44, "that" should read -- for --; and
    Line 45, "are" should read -- to be --.

UNITED STATES PATENT AND TRADEMARK OFFICE
CERTIFICATE OF CORRECTION

PATENT NO. : 7,408,666 B2
APPLICATION NO. : 10/736530
DATED : August 5, 2008
INVENTOR(S) : Kenji Aiyama It is certified that error appears in the above-identified patent and that said Letters Patent is hereby corrected as shown below:

COLUMN 14:
      Line 24, "tot" should read -- to --.

Signed and Sealed this

Twenty-seventh Day of January, 2009

JOHN DOLL
*Acting Director of the United States Patent and Trademark Office*